United States Patent [19]

Kishimoto

[11] Patent Number: 5,538,801
[45] Date of Patent: Jul. 23, 1996

[54] MAGNETOOPTICAL RECORDING MEDIUM

[75] Inventor: Mikio Kishimoto, Osaka, Japan

[73] Assignee: Hitachi Maxell, Ltd., Osaka-fu, Japan

[21] Appl. No.: 385,088

[22] Filed: Feb. 7, 1995

Related U.S. Application Data

[63] Continuation of Ser. No. 203,756, Mar. 1, 1994, abandoned, which is a continuation of Ser. No. 608,467, Nov. 2, 1990, abandoned.

[30] Foreign Application Priority Data

Nov. 13, 1989 [JP] Japan ................. 1-294181

[51] Int. Cl.$^6$ ........................... G11B 5/66
[52] U.S. Cl. .................. 428/694 ML; 428/694 GT; 428/694 DF; 428/694 RL; 428/172; 428/213; 428/214; 428/215; 428/332; 428/336; 428/702; 428/457; 428/900; 369/13
[58] Field of Search ............... 428/694 GT, 694 DE, 428/694 RL, 694 ML, 900, 172, 213, 214, 215, 332, 336, 457, 702; 369/13

[56] References Cited

U.S. PATENT DOCUMENTS

| | | | |
|---|---|---|---|
| 3,224,333 | 12/1965 | Kolk, Jr. ..................... | 365/122 |
| 4,586,092 | 4/1986 | Martens et al. ............... | 360/59 |
| 4,670,322 | 6/1987 | Nakamura et al. ............ | 428/172 |
| 4,690,861 | 9/1987 | Nakamura et al. ............ | 428/623 |
| 4,759,966 | 7/1988 | Shimozawa et al. .......... | 428/694 |
| 4,770,933 | 9/1988 | Kitahata et al. .............. | 428/694 |
| 4,788,095 | 11/1988 | Machida et al. .............. | 428/172 |

FOREIGN PATENT DOCUMENTS

| | | |
|---|---|---|
| 3503996 | 8/1985 | Germany . |
| 133711 | 7/1985 | Japan . |
| 163406 | 8/1985 | Japan . |

*Primary Examiner*—Leszek Kiliman
*Attorney, Agent, or Firm*—Birch, Stewart, Kolasch & Birch LLP

[57] ABSTRACT

A magnetooptical recording medium of good durability and increased reproducing output comprising a substrate and a coating type magnetic layer with a thickness of not larger than 0.5 µm which is formed on the substrate and comprises a binder and a hexagonal system of ferrite particles dispersed therein, wherein a Kerr rotation angle is at least 0.3 degree when it is measured with a light having a wavelength of 830 nm under a residual magnetization condition after a magnetic field of 10 kOe is applied to the magnetic layer, and the reflectance on the surface of the magnetic layer using a light having a wavelength of 830 nm is at least 30%.

6 Claims, 1 Drawing Sheet

1

MAGNETOOPTICAL RECORDING MEDIUM

This application is a continuation of application Ser. No. 08/203,756 filed on Mar. 1, 1994, which was a continuation of Ser. No. 07/608,467 filed on Nov. 2, 1990, both now abandoned.

BACKGROUND OF THE INVENTION

1. Field of the Invention

The present invention relates to a magnetooptical recording medium. More particularly, the present invention relates to a magnetooptical recording medium which comprises a coating type magnetic layer comprising a hexagonal system of ferrite particles in a binder.

2. Description of the Related Art

Recently, a magnetooptical recording medium which magnetically records signals with a semiconductor laser beam has been vigorously studied and developed as a high density recording media.

Hitherto, the magnetooptical recording medium utilizes, as a magnetic element, mostly an amorphous alloy comprising at least one rare earth metal and at least one transition metal such as Tb-Fe-Co alloy, and is prepared by vacuum depositing or spattering such an alloy on a surface of a transparent substrate to form a thin magnetic layer.

With the magnetooptical recording medium comprising the alloy, signals are recorded by irradiating the laser beam on the magnetic layer, heating the magnetic layer to a temperature near a Curie temperature or a compensation temperature to decrease a coercive force of the magnetic layer and reversing magnetization with a magnetic field. The recorded signals are read out by using change of a rotation angle of a plane of polarization of a light reflected at an area in which the magnetization is reversed.

Although the conventional magnetooptical recording medium has an advantage that the amorphous alloy which constitutes the magnetic layer is highly sensitive to the laser beam, the alloy is easily oxidized so that the recording characteristics disadvantageously decrease as time passes. To prevent the oxidation of the alloy, various protective layers are formed on the magnetic layer. However, the oxidation of the amorphous alloy is not completely prevented.

In the conventional magnetooptical recording medium, a polarization angle of light, namely a Kerr rotation angle, is at most about 0.3 degree, so that a reproducing output is insufficiently low. It is proposed to increase the Kerr rotation angle by forming a dielectric layer of $SiO_x$ or $SiN_x$ on the magnetic layer and passing the light through the dielectric layer so as to use multiple interference. When the dielectric layer is formed, the Kerr rotation angle increases, while a reflectance of light decreases. Therefore, the dielectric layer does not greatly contribute to the improvement of recording characteristics.

Under such circumstances, it is suggested to produce a magnetooptical recording medium comprising a thin film magnetic layer which comprises an oxide such as garnet or a hexagonal system ferrite as a magnetic element and is formed on the transparent substrate. Such a magnetooptical recording medium does not suffer from the oxidation problem since the magnetic element is the oxide. But, since the oxide contains plural element different from the metal, it is difficult to keep a composition of the layer constant and thin films having the same characteristics are not prepared with good reproducibility.

To overcome the problem of reproducibility of the above thin film of the oxide, it is proposed to form a coating type magnetic layer on the transparent substrate, which magnetic layer comprises an organic or inorganic binder and hexagonal system ferrite particles dispersed therein. However, with such a magnetooptical recording medium, the Kerr rotation angle is not so large and the reflectance of light on the magnetic layer surface is small, so that the reproducing output tends to be decreased.

SUMMARY OF THE INVENTION

One object of the present invention is to provide a magnetooptical recording medium which has a magnetic layer with a constant composition and can be reliably reproduced.

Anther object of the present invention is to provide a magnetooptical recording medium which comprises a magnetic layer with good durability and has increased reproducing output.

According to the present invention, there is provided a magnetooptical recording medium comprising a substrate and a coating type magnetic layer with a thickness of not larger than 0.5 µm which is formed on the substrate and comprises a binder and a hexagonal system of ferrite particles dispersed therein, wherein a Kerr rotation angle is at least 0.3 degree when it is measured with a light having a wavelength of 830 nm under a residual magnetization condition after a magnetic field of 10 kOe is applied to the magnetic layer, and a reflectance on a surface of the magnetic layer with respect to a light having a wavelength of 830 nm is at least 30%.

DETAILED DESCRIPTION OF THE INVENTION

The present invention relates to a magnetooptical recording medium comprising a transparent substrate and a coating type magnetic layer which comprises a binder and hexagonal system of ferrite particles. As a result, it has been found that, although it was believed that the thicker magnetic layer comprising the binder and the hexagonal system of ferrite particles, for example, a magnetic layer having a thickness of 0.8 µm or more, in particular about 1.3 µm, was preferable to increase the Kerr rotation angle, the thicker magnetic layer cannot be uniformly heated to a deep part with laser beam irradiation and the coercive force is not sufficiently decreased by heating, so that the magnetization is not uniformly reversed over the entire magnetic layer. Therefore, the Kerr rotation angle was unexpectedly decreased although the thickness of the magnetic layer was increased. In addition, when the thickness of the magnetic layer was increased, the amount of light absorbed by the magnetic layer was increased so that sufficient reflectance was not obtained. Further, since the surface of the magnetic layer had inferior smoothness, light scattering on the surface would not be negligible. These factors greatly decreased the reproducing output.

As a result of further study by the present inventors, it has been found that when the thickness of the coating type magnetic layer is 0.5 µm or less, the magnetic layer can be heated to its depth with the laser beam, so that the magnetization can be uniformly reversed over the whole of the magnetic layer.

Since the magnetic layer of the magnetooptical recording medium has a thin thickness, the amount of light absorbed by the magnetic layer is decreased so that the reflectance on the surface is increased. When a magnetic paint comprising the magnetic particles very homogeneously dispersed in a binder, for example, by a sand grinder mill, is spin coated on the substrate to form the magnetic layer with good surface smoothness, light scattering on the surface is prevented so that the light reflectance on the magnetic layer surface is further increased.

With the magnetooptical recording medium having a larger Kerr rotation angle and the increased light reflectance on the magnetic layer surface, the reproducing output is greatly increased in comparison with the conventional magnetooptical recording media. Further, the magnetooptical recording medium of the present invention has good oxidation resistance due to the use of hexagonal system of ferrite particles as the magnetic element, and can be reliably reproduced by coating the substrate with the magnetic paint comprising the binder and the hexagonal system of ferrite particles.

The present invention will be further illustrated with reference to the accompanying drawings.

Figure 1:
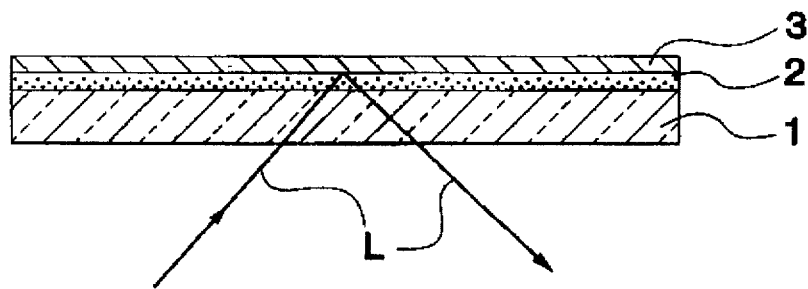
FIGS. 1 to 4 are cross sectional views of four embodiments of the magnetooptical recording medium of the present invention.

FIG. 1 is a cross sectional view of one embodiment of the magnetooptical recording medium of the present invention, which comprises a transparent substrate 1, a coating type magnetic layer 2 comprising a hexagonal system of ferrite particles dispersed in a binder, and a reflecting layer 3.

As the transparent substrate 1, a resinous substrate such as polymethyl methacrylate and polycarbonate substrates or a glass substrate such as a Pyrex glass substrate can be used. In general, the substrate has a guide groove for recording and reproducing.

Preferably, the hexagonal system of ferrite particles is one represented by a composition formula:

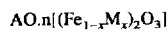

$$AO.n[(Fe_{1-x}M_x)_2O_3]$$

wherein A is at least one element selected from the group consisting of Ba, Sr, Pb and Ca, M is at least one element selected from the group consisting of Co, Ti, Ni, Zn, Zr, Sn, In, Ge, Cu and Mn, preferably a combination of Co and Ti, n is a number of 4 to 10, and x is a number of 0.01 to 0.15. "n" and "x" are selected according to the kinds of A and M and their combination.

Since a hexagonal ferrite system having a composition different from the above has a high Curie temperature of about 400° C., even though it has a larger coercive force around room temperature, it is less preferable for the magnetooptical recording medium.

The ferrite particles of the hexagonal system generally have an average diameter of from 0.01 to 0.08 μm. When the particle size is too large, noise (N) becomes larger so that a S/N ratio is decreased. When the particle size is too small, it is difficult to homogeneously disperse the particles in the binder and thereby to orientate the particles vertically, so that the output is decreased.

The above preferable hexagonal system of ferrite particles may be produced as follows:

Metal salts such as iron chloride, barium chloride, cobalt chloride and titanium chloride are dissolved in water. To the aqueous solution, an aqueous solution of an alkali, such as sodium hydroxide is added to coprecipitate hydroxides of the metals. Then, coprecipitated hydroxides are aged and heated at a temperature of 150° to 180° C. for one to eight hours. The heated material is washed with water and dried, followed by heating at a temperature of 600° to 1000° C. for one to ten hours.

The crystalline composition of the hexagonal ferrite particles system can be easily modified through change of kinds and amounts of the elements to be added. The particle size can be controlled through change of the alkaline concentration and/or a concentration of the metal salt.

As the binder in which the hexagonal system ferrite particle are dispersed and which binds them, a resin having a glass transition temperature ($T_g$) of at least 150° C., in particular at least 200° C. is preferably used. This is because the magnetic layer is heated to about 300° C. even for a moment during recording with the laser beam, and a binder resin having a glass transition temperature of lower than 150° C. is deteriorated after repeated recording and reproducing so that the Kerr rotation angle and in turn the reproducing output are decreased.

As the binder resin having such high glass transition temperature, a resin comprising an epoxy resin as a crosslinking agent is preferred. For example, a well crosslinked polyvinylbutyral or phenol resin with the epoxy resin, and polyimide resin are preferred.

The coating type magnetic layer 2 is formed by coating the magnetic paint comprising the hexagonal system of ferrite particles and the binder in a solvent, on the transparent substrate 1 by a suitable manner, such as spin coating, and drying the coated magnetic paint. During coating the magnetic paint and/or drying, a magnetic field is applied to orient magnetic easy axes of the ferrite particles in a direction perpendicular to the substrate plane.

The coating type magnetic layer 2 has a thickness of not larger than 0.5 μm, preferably from 0.05 to 0.3 μm. When the thickness of the magnetic layer is larger than 0.5 μm, the coercive force is not effectively decreased with the laser beam during recording the signals, the Kerr rotation angle is small and the amount of light absorbed in the magnetic layer increases so that the reflectance decreases. Therefore, it becomes difficult to increase the reproducing output.

In the coating type magnetic layer 2, the coercive force is preferably at least 500 Oe in the temperature range between 0° C. and 150° C. in a direction perpendicular to the substrate plane and is not larger than 200 Oe in the temperature range not lower than 250° C. in a direction perpendicular to the substrate plane.

When the coercive force in the temperature range between 0° C. and 150° C. in the direction perpendicular to the substrate plane is less than 500 Oe, recorded magnetic domains are unstable. In particular, when the signals are reproduced with the irradiation of the laser beam, since the magnetic layer is heated to a temperature of from 100° C. to 150° C., the coercive force should be at least 500 Oe not only at room temperature but also in the above wide temperature range.

During recording the signals, the magnetic layer is heated to near the Curie temperature to decrease the coercive force and, under such conditions, the magnetization is reversed. Since the generally used semiconductor laser beam has a temperature of about 250° C., it is preferable that the coercive force in the direction perpendicular to the substrate plane is not larger than 200 Oe. Otherwise, it is difficult to reverse the magnetization. When the coercive force at 250° C. is 200 Oe or less, the coercive force is smaller at a temperature higher than 250° C., so that the stable signals can be recorded with the semiconductor laser beam.

In addition to the above specific coercive force, the coating type magnetic layer 2 has a squareness (a ratio of residual magnetization to saturation magnetization) of at least 0.6, preferably at least 0.7 in the direction perpendicular to the substrate plane. When the squareness is less than 0.6, the reproducing output decreases since the plane of polarization of the reflected light is scattered during reproducing though the Kerr rotation angle of the magnetic element itself is large.

To adjust the coercive force and the squareness of the coating type magnetic layer 2 in the above ranges, the magnetic paint comprising the above described hexagonal system ferrite particles and the binder resin is coated on the substrate 1. Thus, the magnetic layer having a constant composition with the above coercive force and the squareness is stably formed with good reproducibility.

Since the coating type magnetic layer 2 comprises the oxide type hexagonal system of ferrite particles as the magnetic particles, it essentially does not suffer from the oxidation problem which is seen in the amorphous alloy thin film.

The reflecting layer 3 provides a reflecting plane on the magnetic layer to increase the light reflectance on the magnetic layer surface. As the reflecting layer, a metal thin film of, for example, Al, Cu, Au and Ag, and a compound thin film of, for example, TeO, TeC, TiN and TaN can be used. The reflecting layer 3 is formed by the conventional vacuum deposition or spattering method. Alternatively, particles of the above metal or compound are coated on the substrate together with a suitable liquid medium. The thickness of the reflecting layer is not critical and preferably from 0.05 to 1 µm.

Figure 2:
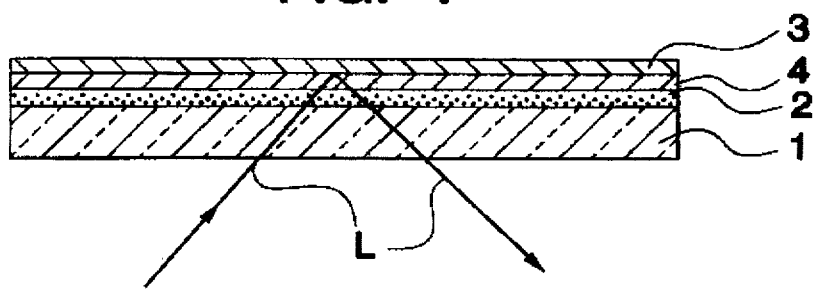

FIG. 2 is a cross sectional view of another embodiment of the magnetooptical recording medium of the present invention, which further comprises a transparent dielectric layer 4 between the coating type magnetic layer 2 and the reflecting layer 3. The dielectric layer further increases the Kerr rotation angle.

As the transparent dielectric layer 4, SiO, $SiO_2$, TiO, $TiO_2$, $SiN_x$ and the like are preferably used. The dielectric layer 4 may be formed by the conventional vacuum deposition or spattering method, though it may be formed by the coating of particles of the above material. The thickness of dielectric layer is not critical and preferably is from 0.03 to 0.2 µm.

In the magnetooptical recording medium of the present invention, the Kerr rotation angle is at least 0.3 degree, preferably at least 0.35 degree when it is measured with a light having a wavelength of 830 nm under a residual magnetization condition after a magnetic field of 10 KOe is applied to the magnetic layer, and a reflectance on a surface of the magnetic layer against a light having a wavelength of 830 nm is at least 30%, preferably at least 35%.

The Kerr angle can be set at any value not smaller than 0.3 degree by using the hexagonal system of ferrite particles and the binder and adjusting the coercive force and the squareness of the magnetic layer since the magnetic layer has a thickness of not larger than 0.5 µm.

The reflectance can also be set at any value not smaller than 30% by preventing the light scattering through formation of the magnetic layer with good surface smoothness which is achieved by homogeneous dispersion of the magnetic paint, since the absorbed amount of light by the magnetic layer is decreased because of the limited thickness of the magnetic layer.

With the magnetooptical recording medium of the present invention having the above Kerr angle and the light reflectance, signals are recorded and reproduced by irradiating the laser beam from the transparent substrate side as shown in FIGS. 1 and 2. That is, the signals are recorded by irradiating the laser beam L from the transparent substrate side while applying the magnetic field from the reflecting layer side to reverse the magnetization. For reproducing the signals, the laser beam L is irradiated from the transparent substrate side, and passes through the coating type magnetic layer 2 and, optionally the transparent dielectric layer 4, reflects from the reflecting layer 3, and again passes through the coating type magnetic layer 2 and optionally the transparent dielectric layer 4, whereby the laser beam is polarized. Then, the polarized beam is drawn from the magnetooptical recording medium. The reproducing output is far larger than with the conventional magnetooptical recording media because of the large Kerr rotation angle and the large reflectance in the present invention.

Although the laser beam L is irradiated from the transparent substrate side in the above embodiments, it is possible to record and reproduce the signals by irradiating the laser beam L from the coating type magnetic layer side.

Figure 3:
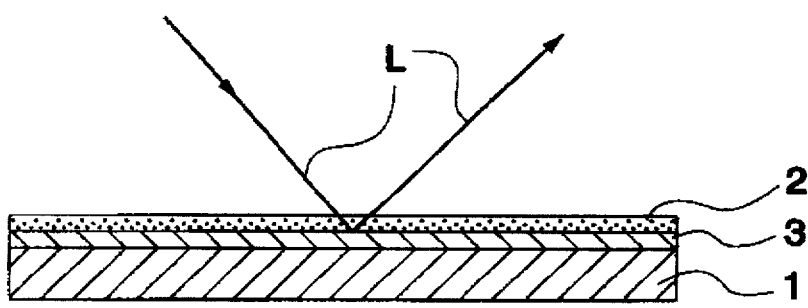
Figure 4:
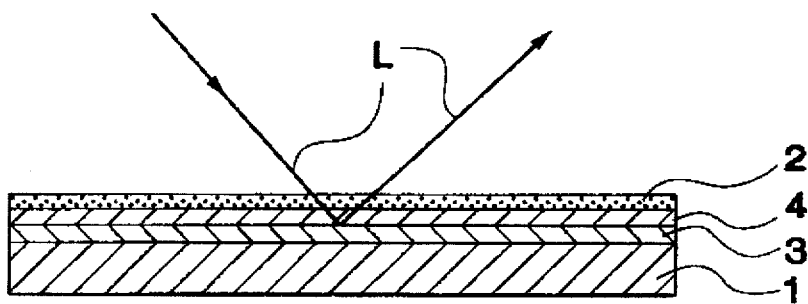

FIGS. 3 and 4 show such embodiments. In FIG. 3, the reflecting layer 3 is formed on the substrate 1, and the coating type magnetic layer 2 is formed on the reflecting layer 3. In FIG. 4, the transparent dielectric layer 4 is further provided between the reflecting layer 3 and the coating type magnetic layer 2. In the embodiments of FIGS. 3 and 4, the substrate 1 is not necessarily transparent and may be an aluminum plate with a polished surface. When the substrate has a smooth surface by polishing or plating, the reflecting layer may be eliminated.

In general, the magnetooptical recording medium of the present invention is in the form of a disc or a card, although it may be in other forms depending on the object and use.

PREFERRED EMBODIMENTS OF THE INVENTION

The present invention will be explained further in detail by the following Examples, in which "parts" are by weight unless otherwise indicated.

Seven kinds of hexagonal systems of barium ferrite particles used in the Examples were prepared as follows:

Preparation of Hexagonal Ferrite System

A mixture of iron chloride, barium chloride, cobalt chloride and titanium chloride was dissolved in an amount of water. To the solution, an aqueous solution of sodium hydroxide was added until the pH reached about 12 to coprecipitate the hydroxides of the above metals. The coprecipitated material was aged at room temperature for about 20 hours and heated at 300° C. for 4 hours in an autoclave. The heated material was washed with water and suspended in water. To the suspension, sodium chloride in an amount of a half of the weight of the precipitated material was dissolved.

The suspension was filtered and the recovered material was dried in the air at 100° C. and heated and sintered in the air at 800° C. for 2 hours. The sintered powder material was washed with water to remove sodium chloride followed by drying in the air to obtain $BaO.6[(Fe_{1-x}M_x)_2O_3$ wherein M is as shown in Table 1, and x is 0.12 (in A1 and A2), 0.09 (in B1 and B2), 0.05 (in C), 0.08 (in D) or 0.20 (in E).

TABLE 1

| No. | Composition | Particle size (μm) |
|---|---|---|
| A1 | $BaFe_{10.56}Co_{0.72}Ti_{0.72}O_{19}$ | 0.042 |
| A2 | $BaFe_{10.56}Co_{0.72}Ti_{0.72}O_{19}$ | 0.072 |
| B1 | $BaFe_{10.92}Co_{0.54}Ti_{0.54}O_{19}$ | 0.048 |
| B2 | $BaFe_{10.92}Co_{0.54}Ti_{0.54}O_{19}$ | 0.070 |
| C | $BaFe_{11.40}Co_{0.30}Ti_{0.30}O_{19}$ | 0.058 |
| D | $BaFe_{11.04}Co_{0.48}Ti_{0.48}O_{19}$ | 0.067 |
| E | $BaFe_{9.60}Co_{1.20}Ti_{1.20}O_{19}$ | 0.045 |

EXAMPLE 1

To the hexagonal system of ferrite particles A1 (100 parts), polyvinylbutyral (10 pats) and cellosolve acetate (150 parts) were added and the mixture was dispersed in a sand grinder mill for 4 hours. To the mixture, an epoxy resin (10 parts) was added while mixing to prepare a magnetic paint.

The magnetic paint was spin coated on a glass substrate having a guide groove and dried in an N-S opposed magnetic field. Then, the coated substrate was heated at 200° C. for about 10 hours to cure the binder to form a magnetic layer having a thickness of 0.29 μm, in which the binder had a glass transition temperature of 290° C.

On the magnetic layer, metal aluminum was vacuum deposited to form a reflecting layer having a thickness of 0.3 μm to produce a magnetooptical recording medium.

EXAMPLES 2–8

In the same manner as in Example 1 but using the hexagonal system ferrite particles A1, A2, B1 or B2 and adjusting the thickness of the magnetic layer in the range between 0.14 and 0.48 μm, seven magnetooptical recording media shown in Table 2 were produced.

In Example 2, the amounts of the binder resins were changed to 15 parts of polyvinylbutyral and 5 parts of the epoxy resin to obtain the cured resin having the glass transition temperature of 170° C. Of course, the mixing time and other conditions for the preparation of the magnetic paints were slightly modified.

COMPARATIVE EXAMPLES 1–5

In the same manner as in Example 1 but using the hexagonal system ferrite particles A1, C, D or E and adjusting the thickness of the magnetic layer in the range between 0.14 and 0.71 μm, five magnetooptical recording media were produced while slightly modifying the mixing time and other conditions for the preparation of the magnetic paints.

With each of the magnetooptical recording media produced in the Examples and Comparative Examples, the coercive force and the squareness as the magnetic characteristics, the Kerr rotation angle and the light reflectance as the optical characteristics and the size and shape of the magnetic domain, after recording as the writing characteristics, were measured by the following procedures. The results are shown in Table 2 together with the kinds of the used hexagonal ferrite particle system.

Magnetic characteristics

The coercive force in the direction perpendicular to the substrate plane was measured at 0° C., 25° C., 120° C., 150° C. or 250° C. The squareness in the same direction was measured at 25° C.

Kerr rotation angle

With an apparatus for observing magnetic domain structure, the Kerr rotation angle was measured at a wavelength of 830 nm under the residual magnetization condition after applying the magnetic field of 10 kOe.

Light reflectance

A light having a wavelength of 830 nm was extracted from a xenon lamp and irradiated on the magnetooptical recording medium and reflected light was detected with a spectrophotometer. The reflectance was obtained as a relative value to a reference film (aluminum deposited film) as 100%.

Writing characteristics

While applying the magnetic field of 500 Oe with a permanent magnet from the opposite side to the substrate, the semiconductor laser beam having a wavelength of 830 nm and a beam diameter of about 1 (one) μm was irradiated from the substrate side for a certain period of time to reverse the magnetization. The writing characteristics were evaluated from the size and the shape of magnetic domain after writing.

TABLE 2

| Example No. | Hexagonal system ferrite | Thickness of magnetic layer (μm) | Coercive force (Oe) | | | | | Squareness | Kerr rotation angle (°) | Light reflectance (%) | Diameter of magnetic domain (μm) |
|---|---|---|---|---|---|---|---|---|---|---|---|
| | | | 0° C. | 25° C. | 120° C. | 150° C. | 250° C. | | | | |
| 1 | A1 | 0.29 | 830 | 950 | 1390 | 1530 | 130 | 0.83 | 0.40 | 48 | 1.3 |
| 2 | ↑ | 0.29 | 880 | 1000 | 1430 | 1570 | 140 | 0.83 | 0.39 | 45 | 1.4 |
| 3 | ↑ | 0.14 | 890 | 1030 | 1470 | 1600 | 150 | 0.85 | 0.35 | 52 | 1.1 |
| 4 | ↑ | 0.48 | 820 | 930 | 1360 | 1500 | 120 | 0.82 | 0.32 | 36 | 0.9 |
| 5 | A2 | 0.29 | 710 | 830 | 1250 | 1360 | 90 | 0.84 | 0.33 | 43 | 1.2 |
| 6 | B1 | 0.29 | 1090 | 1180 | 1560 | 1670 | 180 | 0.83 | 0.38 | 46 | 1.0 |
| 7 | ↑ | 0.14 | 1130 | 1220 | 1600 | 1710 | 190 | 0.84 | 0.36 | 55 | 1.2 |
| 8 | B2 | 0.29 | 1040 | 1120 | 1490 | 1600 | 160 | 0.86 | 0.33 | 40 | 1.1 |
| Com. 1 | A1 | 0.55 | 820 | 920 | 1350 | 1480 | 120 | 0.82 | 0.38 | 24 | *1) |
| Com. 2 | ↑ | 0.71 | 810 | 920 | 1340 | 1470 | 120 | 0.82 | 0.35 | 18 | *1) |
| Com. 3 | C | 0.29 | 1270 | 1340 | 1710 | 1800 | 260 | 0.83 | 0.26 | 42 | *1) |
| Com. 4 | D | 0.29 | 900 | 880 | 780 | 740 | 550 | 0.84 | 0.04 | 45 | *1) |
| Com. 5 | E | 0.14 | 260 | 320 | 490 | 480 | 70 | 0.83 | 0.10 | 54 | *2) |

Note:
*1) No magnetic domain was observed.
*2) A shape of magnetic domain was unclear.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetooptical recording medium comprising a transparent substrate, a magnetic layer having a thickness of not larger than 0.5 μm formed on said substrate, and a reflecting layer formed on said magnetic layer, said magnetic layer consisting essentially of a binder having a glass transition temperature of at least 150° C. and hexagonal system of ferrite particles having an average diameter of from 0.01 to 0.08 μm dispersed therein, a coercive force of at least 500 Oe in a temperature range of from 0° to 150° C. and a squareness ratio of at least 0.6, wherein a Kerr rotation angle of said magnetooptical recording medium is at least 0.3 degree when it is measured with a light having a wavelength of 830 nm under a residual magnetization condition after a magnetic field of 10 KOe is applied to said magnetic layer, and a reflectance at the surface of said magnetic layer against a light having a wavelength of 830 nm is at least 30%.

2. The magnetooptical recording medium according to claim 1, wherein said coercive force of said magnetic layer is not larger than 200 Oe at a temperature of 250° C. in a direction perpendicular to a substrate plane.

3. The magnetooptical recording medium according to claim 1, which further comprises a transparent dielectric layer between said magnetic layer and said reflective layer.

4. A magnetooptical recording medium comprising a substrate, a reflective layer formed on said substrate, and a magnetic layer having a thickness of not larger than 0.5 μm formed on said reflective layer, said magnetic layer consisting essentially of a binder having a glass transition temperature of at least 150° C. and hexagonal system of ferrite particles having an average diameter of from 0.01 to 0.08 μm dispersed therein, a coercive force of at least 500 Oe in a temperature range of from 0° to 150° C. and a squareness ratio of at least 0.6, wherein a Kerr rotation angle of said magnetooptical recording medium is at least 0.3 degree when it is measured with a light having a wavelength of 830 nm under a residual magnetization condition after a magnetic field of 10 KOe is applied to said magnetic layer, and a reflectance at the surface of said magnetic layer against a light having a wavelength of 830 nm is at least 30%.

5. A magnetooptical recording medium according to claim 4, further including a transparent dielectric layer between said reflecting layer and said magnetic layer.

6. The magnetooptical recording medium according to claim 4, wherein said coercive force of said magnetic layer is not larger than 200 Oe at a temperature of 250° C. in a direction perpendicular to a substrate plane.

* * * * *